March 10, 1925.                                                   1,528,930
                       S. H. LA PLANT ET AL
SYSTEM FOR THE PRODUCTION OF FUEL GAS BY THE OPERATION OF
                  AN INTERNAL COMBUSTION ENGINE
                        Filed Nov. 12, 1923
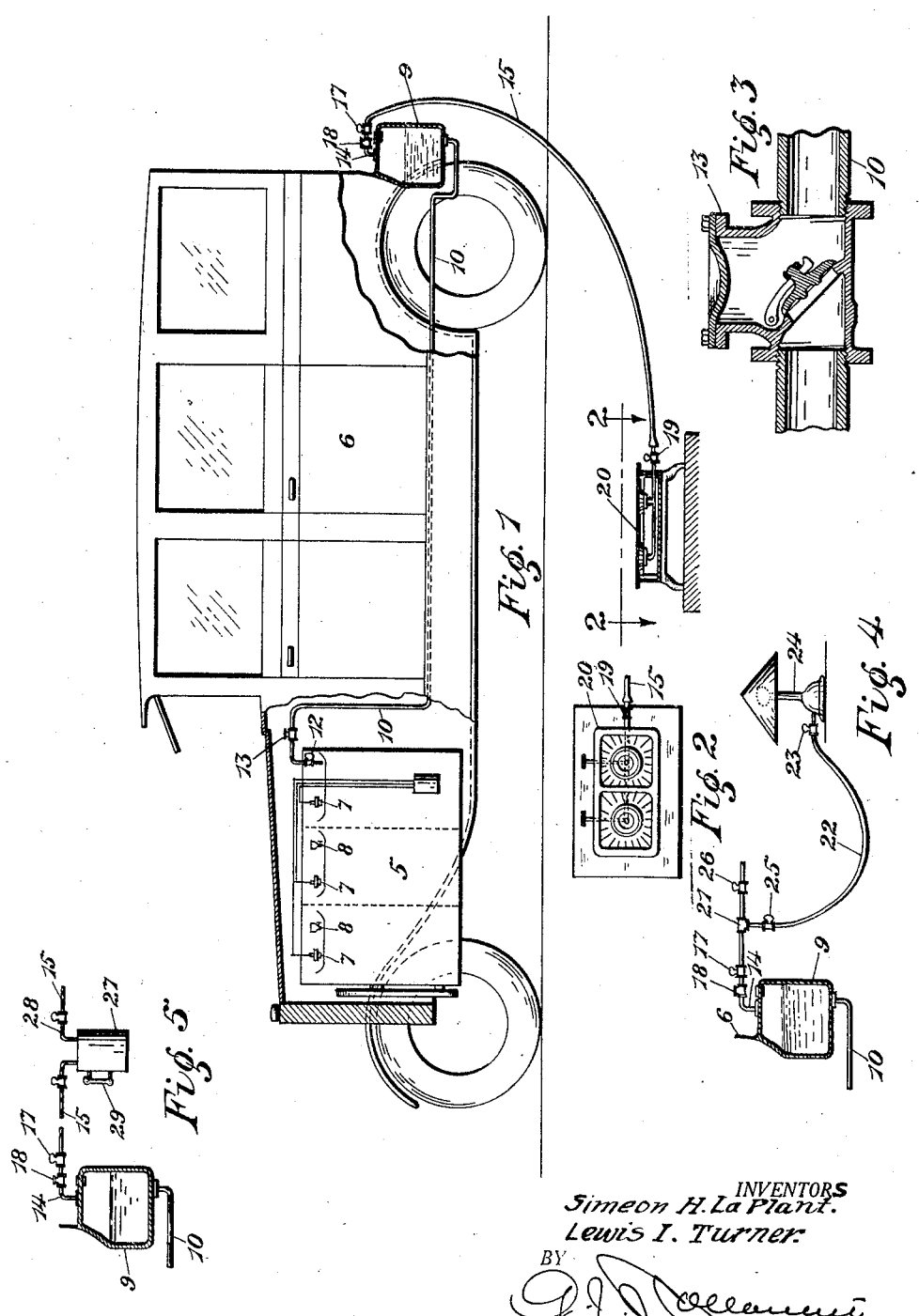
INVENTORS
Simeon H. La Plant.
Lewis I. Turner.
BY
                        ATTORNEY.

Patented Mar. 10, 1925.

1,528,930

UNITED STATES PATENT OFFICE.

SIMEON H. LA PLANT AND LEWIS IRVIN TURNER, OF SALIDA, COLORADO, ASSIGNORS, BY DIRECT AND MESNE ASSIGNMENTS, TO THE L. T. N. MANUFACTURING & DEVELOPMENT SYSTEM, OF PLATTEVILLE, COLORADO, A COMMON LAW TRUST AGREEMENT, OF COLORADO.

SYSTEM FOR THE PRODUCTION OF FUEL GAS BY THE OPERATION OF AN INTERNAL-COMBUSTION ENGINE.

Application filed November 12, 1923. Serial No. 674,306.

*To all whom it may concern:*

Be it known that we, SIMEON H. LA PLANT and LEWIS IRVIN TURNER, citizens of the United States, residing at Salida, in the county of Chaffee and State of Colorado, have invented certain new and useful Improvements in Systems for the Production of Fuel Gas by the Operation of an Internal-Combustion Engine, of which the following is a specification.

Our invention relates to a system for the production of a fuel gas by the operation of an internal combustion engine and its principal object is to provide in combination with the engine and a suitable burner, a system of co-operative devices which supplies to the burner, a fuel gas produced by the operation of the engine.

The invention is particularly adapted for use in connection with motor driven vehicles and another object is to provide in combination with the internal combustion engine of the vehicle and a burner, means for the production of a fuel gas by passing a product of the explosion of combustible gases in the engine, through a body of gasoline or other hydrocarbon liquid in the fuel-supply tank of the same and thence conducting it to the burner.

Other objects of the invention will appear in the course of the following description made with reference to the accompanying drawings in which a preferable embodiment of the invention is illustrated, it being understood that changes in the construction and arrangement of the parts and elements comprised in the system, can be made without departing from the spirit of the invention herein disclosed and within the scope of the invention as defined in the hereunto appended claims.

In the drawings in the several views of which like parts are similarly designated, Figure 1 represents in sectional elevation, a motor driven vehicle of conventional form and construction to which my improved system of generating a fuel gas is applied;

Figure 2, a plan view of the burner included in the construction shown in Figure 1;

Figure 3, a sectional view of the check valves used to prevent the return flow of gases in the system;

Figure 4, a fragmentary view showing the application of my invention to the burner of a lamp for the production of artificial light; and Figure 5, a fragmentary sectional view of the gasolene tank of the vehicle showing its connection with a reservoir for the storage of gas produced in the operation of our invention.

Referring to the drawings, 5 designates the internal combustion engine of a motor vehicle 6, provided as usual in connection with the explosion spaces of its cylinders, with spark plugs 7 and relief cocks 8.

A tank 9 at the rear end of the vehicle is as usual, provided for the supply of hydrocarbon gas to the carburetor in which the fuel mixture for the operation of the engine, is produced.

In accordance with the present invention the opening of one of the cylinders of the engine, normally occupied by a relief-cock 8, is by means of a conduit 10 connected with an opening in the bottom of the fuel-tank 9, the conduit being provided with a control valve 12 and with a check valve 13 which prevents the return flow of gases to the cylinder.

A second opening in the supply tank, above the level of the liquid contained therein, provides an outlet which connects with a conduit preferably composed of a fixed nipple 14 and a flexible tube 15. The outlet is preferably made in the filler cap 16 of the tank and the nipple is provided with a control valve 17 and with a check valve 18 which in the operation prevents the return flow of gases to the tank.

The flexible tube 15 in the construction shown in Figure 1, connects with the gas-intake 19 of a two-burner gas stove 20 of conventional construction which may be placed in any convenient position relative to the vehicle.

Figure 3 illustrates a check valve adapted for use in the above described connections, but it will be understood that valves of different construction and form may be employed with equally satisfactory results.

In Figure 4, the outlet pipe 14 at the top of the supply tank has been lengthened to provide for the application of a branch-nipple 21 which by means of a flexible tube 22, is connected to the intake 23 of a gas lamp 24 of ordinary construction.

A valve 25 in the nipple and a valve 26 at the end of the main pipe to which in this form of the invention, the tube 15 leading to the stove 20 is attached, provide the means for controlling the supply of fuel gas to the stove and the lamp so that either appliance may be used separate from the other or both may be used at the same time, as desired.

Our invention as shown and hereinabove described, is based on the discovery that the product of combustion of an explosive charge in a cylinder of an internal combustion engine, passed through a body of gasolene or other hydrocarbon liquid, produces without any further treatment or admixture, a gas which will burn in an ordinary gas-stove or gas-lamp as a fuel or an illuminant.

The gas is produced as long as the engine is in operation, and the tank contains gasolene through which the exhaust gases of the engine may pass, and while in this respect our invention may be applied to any internal combustion engine, it is more particularly adapted for use in connection with motor driven vehicles, owing to the convenient arrangement of the parts thereof, and the advantages obtained by said connection.

The camper or traveller can by the use of our invention, obtain at any time sufficient heat for cooking or warming purposes and enough light to answer every requirement, immediately and without any preparation other than attaching the tube leading from the outlet of the supply tank, to the stove or lamp.

The annoyance and danger of campfires, gasolene or kerosene stoves and lamps and other heating and lighting appliances of similar type are completely avoided, and inasmuch as the consumption of gasolene in the operation of the system is comparatively little and the cost of producing and installing the simple parts comprised in the system is very low, the use of the invention is within reach of every owner of a motor vehicle.

In the construction illustrated in Figure 5, the outlet of the gasolene tank is connected with a reservoir 27 in which the fuel gas produced in accordance with our invention, can be stored for future use.

The reservoir has a valve-controlled outlet 28 for the supply of gas to the burners of the stove or lamp, and a pressure-gage 29 may be provided to indicate the quantity of gas contained in the reservoir.

In this manner, the gas can be produced while the automobile is being driven and when the gas is required for cooking or illuminating purposes, the stove or lamp is merely attached to the outlet of the reservoir, thereby eliminating the sometimes objectionable necessity of running the engine of the vehicle to supply the gas directly to the burners.

What we claim and desire to secure by Letters Patent is:

1. The combination with a motor driven vehicle having an internal combustion engine, of a reservoir carried by the vehicle and containing a body of hydrocarbon liquid, a permanent conduit connecting the combustion space of a cylinder of the engine with the reservoir below its liquid level, a gas burner and a conduit connecting the reservoir above the liquid level with the gas burner.

2. The combination with a motor driven vehicle having an internal combustion engine, of a reservoir carried by the motor vehicle and containing a body of hydrocarbon liquid, a permanent conduit connecting the combustion space of a cylinder of the engine with the reservoir below its liquid level, a portable gas burner, a flexible conduit connecting the reservoir above the liquid level with the burner and valves for controlling the flow of gases through the conduits.

3. The combination with a motor driven vehicle having an internal combustion engine of a supply tank carried by the motor vehicle and containing a body of hydro-carbon liquid for use in the operation of the engine, a portable gas burner, a permanent conduit connecting the space of a cylinder of the engine with the supply tank below its liquid level and a flexible conduit connecting the supply tank above the liquid level with the burner.

4. The combination with a motor driven vehicle having an internal combustion engine, of a supply tank carried by the motor vehicle and containing a body of hydrocarbon liquid for use in the operation of the engine, an apertured filler cap on the tank, a gas burner, a permanent conduit connecting the combustion space of a cylinder of the engine with the supply tank below its liquid level and a flexible conduit connecting an opening in the filler cap of the supply tank with the burner.

5. The combination with a motor driven vehicle having an internal combustion engine, of a supply tank carried by the motor vehicle and containing a body of hydrocarbon liquid for use in the operation of the engine, an apertured filler cap on the tank, a gas burner, a permanent conduit connecting the combustion space of a cylinder of the engine with the supply tank below its liquid level, a valve controlled nipple connected with an opening of the filler cap and a flexible conduit connecting the nipple with the burner.

6. The combination with a motor driven vehicle having an internal combustion engine, of a reservoir carried by the motor vehicle and containing a body of hydrocarbon liquid, a portable gas stove, a permanent conduit connecting the combustion space of a cylinder of the engine with the reservoir below the liquid level thereof and a flexible conduit connecting the reservoir above the liquid level with the stove.

7. The combination with a motor driven vehicle having an internal combustion engine of a reservoir containing a body of hydrocarbon liquid, a portable gas stove, a portable gas lamp, a permanent conduit connecting the combustion space of a cylinder of the engine with the reservoir below the liquid level and conductive means to connect the reservoir above the liquid level with the stove and the lamp.

8. The combination with a motor driven vehicle having an internal combustion engine of a reservoir carried by the motor vehicle and containing a body of hydro-carbon liquid, a burner, and means for conducting exhaust gas of the engine through said liquid body and thence to the burner and for controlling the passage of the gas through said conductive means.

In testimony whereof we have affixed signatures.

SIMEON H. LA PLANT.
LEWIS IRVIN TURNER.